July 2, 1940.  J. MUROS  2,206,551
SHAVING IMPLEMENT
Filed Sept. 21, 1936

Inventor
Joseph Muros.
by H. W. Hemway
Atty.

Patented July 2, 1940

2,206,551

UNITED STATES PATENT OFFICE 2,206,551

SHAVING IMPLEMENT

Joseph Muros, Cambridge, Mass., assignor to Gillette Safety Razor Company, Boston, Mass., a corporation of Delaware Application September 21, 1936, Serial No. 101,716

8 Claims. (Cl. 30—43)

This invention relates to implements for shaving without the use of lather and of the type employing co-operating and relatively movable shearing members.

Objects of the invention are, in general, to improve the construction, reduce the cost and improve the shaving efficiency of implements of this type. To these ends an important feature of the invention consists in a tubular or cylindrical guard of relatively small diameter as compared to its length which is supported at its ends only so that its body portion is unobstructed by other parts of the implement and may be moved across the face of the user in a manner creating a skin wave. This tends to cause the hairs to stand out from the surface of the face and thus more hairs are presented in position to be sheared than in using a guard having an extended flat contact face which has rather the effect of ironing down those hairs not immediately entering the spaces between the shearing teeth. The skin wave effect of my novel shearing implement is increased by mounting the guard, as suggested, since its body extends free and clear from other parts of the implement and the skin is engaged only by a cylindrical member of relatively small diameter.

In addition to these functional advantages, it should be noted that the cylindrical or tubular guard contemplated by my invention may be constructed advantageously and that its curved contact face may be reduced to small thickness without objectionably weakening the guard structure. On this account, the implement is effective for close shaving, the length of the stubble remaining on the face being reduced to a minimum.

Another important feature of my invention consists in providing the shearing slots of the guard with enlarged openings at one or both ends. Such openings increase the number of hairs brought into shearing relation with the implement by surrounding or collecting them in relatively wide areas and then directing them into the shearing zone. This effect is accentuated by leaving these openings in the guard unobstructed at all times so that the hairs are free to enter the openings throughout the entire cycle of the implement. As herein shown, the guard contains a movable shearing member comprising a toothed bar which fits the bore of the guard throughout a part of its circumference and which is preferably cut away in those portions which would otherwise register with the enlarged openings of the guard.

The tubular guard of my invention is herein shown as provided with a series of transverse slots which provide the stationary shearing edges of the implement. Another feature of the invention, applicable not only to a tubular guard but to a slotted guard of any shape, consists in providing each slot with a narrow bridge member so arranged as to engage and lift any hair which may lie longitudinally in the slot without projecting it inwardly across its shearing edge.

These and other features of the invention will be best understood and appreciated from the following description of a preferred embodiment thereof, selected for purposes of illustration and shown in the accompanying drawing, in which—

Figure 1:
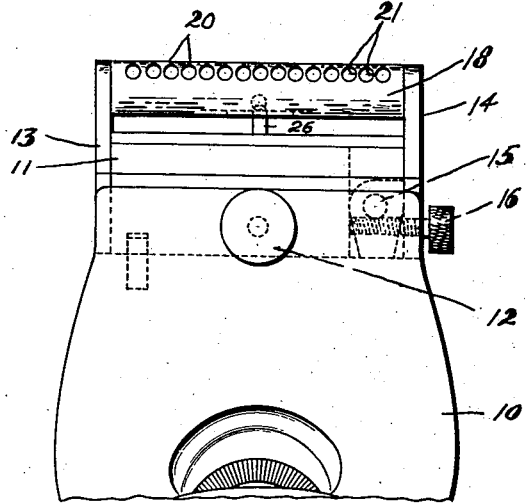
Fig. 1 is a view in front elevation, a portion of the casing being broken away.
Figure 2:
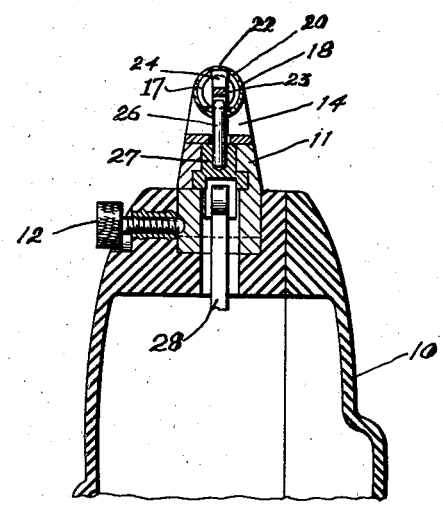
Fig. 2 is a corresponding view in cross-section.

All of the figures are shown on a greatly enlarged scale.

The implement comprises an elongated casing 10, only partly shown in the drawing, which serves as a handle and in the forward end of which is clamped the head carrying the guard and cutter mechanism. It will be understood that the casing 10 also houses a small motor, not shown, which is connected through an operating lever 28 to the movable shearing member of the implement and by means of which the latter is maintained in a state of rapid vibration when the implement is in use.

The casing 10 is provided in its upper or forward end with a rectangular channel in which is fitted a holder block 11, the block being removably retained in place by a clamping screw 12 which is threaded into one wall of the casing. The block 11 is provided at one end with a stationary upstanding arm 13 and at the other end with an arm 14 pivotally mounted upon a transverse pin 15 to swing longitudinally with respect to the block. Threaded into the lower end of the arm 14, below the pivot pin 15, is a clamping or positioning screw 16 arranged at its inner end to engage the body of the block 11 so as to clamp the arm 14 in upright position when screwed inwardly to the limit of its movement. The end of the block 11 opposite to the lower end of the arm 14 is bevelled to permit the upper end of the arm to swing outwardly when the screw 16 is retracted.

Figure 3:
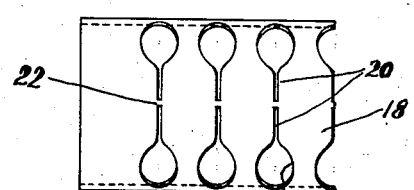
Fig. 3 is a fragmentary development of the guard surface on an enlarged scale.
Figure 4:
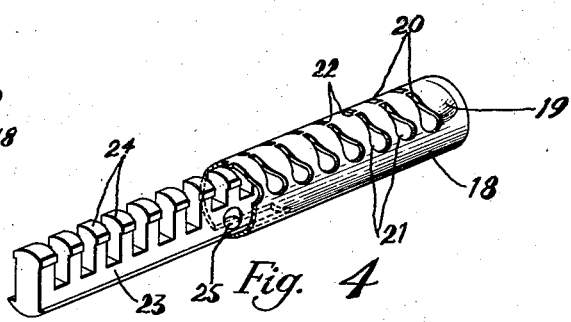
Fig. 4 is a view in perspective of the guard and cutter members.
Figures 5, 6:
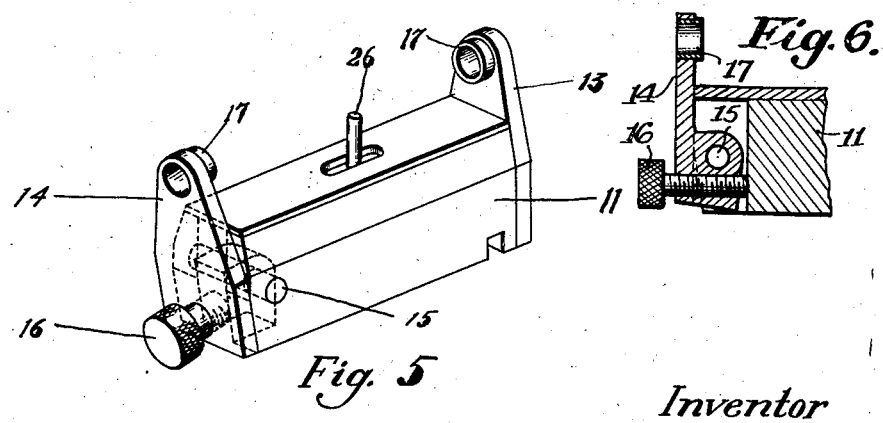
Fig. 5 is a view in perspective of the guard holding block.
Fig. 6 is a fragmentary view in longitudinal section, and on an enlarged scale, of one end of the guard support.

The tubular or cylindrical guard member 18 is mounted by end engagement between the upper ends of the arms 13 and 14 which for that purpose are provided with opposed inwardly extending circular bosses or flanges 17, as best shown in Fig. 5. The guard 18 comprises a hollow metal cylinder having a circular bore and is reduced in thickness at its upper face by being cut away as indicated at 19 in Fig. 4. The upper or contact face of the guard 18 is provided with a series of transverse parallel slots 20 arranged in spaced parallel relation and each terminating at both of its ends in an enlarged rounded opening 21. The slots 20 are of such length that the openings 21 are located upon the curved side walls of the cylinder while the slots occupy the upper curved contact face of the cylinder. The slots 20 are not continuous but are each interrupted by a narrow bridge 22, best shown in Fig. 3. When the guard is presented to the face of the user one or more hairs will enter the rounded openings 21 and then, as the implement is moved transversely, the hair or hairs will be led into the slots 20 wherein the shearing operation takes place, as will presently appear. It is intended that slots 20 should be narrow for effective shearing and that the enlarged rounded openings 21 should be at least four or five times as wide as the slots. In Fig. 3 the openings are shown about seven times the width of the slots 20, such dimensions giving the openings sufficient area to enclose a substantial number of hairs and lead them into the narrow shearing slots.

Co-operating with the cylindrical guard 18 is a reciprocatory cutter bar 23 having cylindrical upper and lower faces concentric with and fitting in the bore of the guard 18. The opposite sides of the cutter bar are flattened or slabbed off to form parallel vertical side faces and these faces are shouldered at their upper and lower edges for the purpose of extending the cylindrical surfaces of the cutter bar. The cutter bar is provided with a series of transverse slots forming spaced shearing teeth 24 having segmental shearing edges adapted to co-operate with circular shearing edges formed by the slots 20 in the guard. It will be noted that by cutting away the side portions of the cutter bar 23 the rounded openings 21 in the guard are at all times left open, free and unobstructed internally so that hairs may always enter them and never be blocked off as is the case in many types of shaving implements.

The cutter bar 23 is provided midway between its ends with a transverse hole into which opens a hole 25 extending through the bottom of the bar. The hole 25 in the cutter bar, moreover, registers with a longitudinal slot formed in the bottom of the guard 18 for the passage of a vertical actuating pin 26. It will be understood that the cutter bar 23 is slightly shorter than the tubular guard 18 and that it may be longitudinally reciprocated by the movement of the pin 26. The actuating pin 26 projects through the upper face of the block 11 from a slide member 27 which is guided for longitudinal reciprocation within the body of the block 11. The slide itself is provided with downwardly extending forked projections to receive the upper end of the oscillating lever 28 already referred to.

It will be noted that the tubular guard 18 and the cutter bar 23 constitute a self-contained removable unit which is detachably held in place by the circular flanges 17 and endwise pressure of the arms 13 and 14. When it is desired to remove the shearing unit the clamping screw 15 is retracted and the arm 14 swung outwardly into the position shown in Fig. 5. The ends of the guard may then be disengaged from the circular flanges 17 and as the unit is removed the actuating pin 26 is drawn out of the hole 25 in the bottom of the cutter bar and through the slot in the bottom of the guard. The cutter bar is then free to be removed endwise from the guard. In reassembling the implement, after cleaning or replacing the shearing unit, the foregoing steps may be carried out easily in reverse order and the implement thus made ready for shaving.

The diameter of the guard 18 is relatively small, for example about one-eighth of an inch. Accordingly, in passing the implement over the face a wave in the skin is created which tends to make the hairs stand up and readily enter the openings 21. The small diameter of the guard also permits its contact surface to be reduced to a minimum thickness with the resulting advantages already discussed.

Having thus described my invention but without in anyway limiting its application to structures of the dimensions suggested; I claim as new and desire to secure by Letters Patent:

1. An implement of the class described, comprising an elongated tubular guard member having a series of narrow transverse slots forming shearing teeth therein and each terminating in an enlarged rounded hair-collecting opening which extends through the wall of the guard member and is several times the width of the communicating slot, and a co-operating shearing member movable within the guard member and shaped to clear said enlarged openings leaving them always unobstructed in the operation of the implement.

2. An implement of the class described, comprising a tubular guard having its contact face traversed by a series of narrow transverse slots forming shearing teeth, each slot opening into an enlarged rounded opening at its ends which is several times the width of the slot, and a co-operating shearing member movably contained within the guard and shaped to clear said rounded openings.

3. An implement of the class described, comprising a tubular guard having its contact face traversed by a series of narrow cross slots forming shearing teeth, each slot opening into an enlarged rounded opening which is at least several times the width of the slot and is shaped to facilitate the entrance of hairs and to guide them into the narrower slots as the implement is moved across the face of the user, and a co-operating shearing member movable within the guard and shaped to clear said rounded openings.

4. An implement of the class described, comprising a tubular guard having its contact face traversed by a series of narrow cross slots forming shearing teeth, each slot terminating in a rounded opening substantially wider than the slot and located in a portion of the guard which curves away from its contact face, and a reciprocatory shearing member within the guard and shaped to clear said rounded openings.

5. An implement of the class described, comprising a holder with spaced projecting arms having opposed bosses thereon, a cylindrical guard fitting over said bosses and supported at its ends thereby, the guard having cross slots in its contact face and hair-receiving openings in its side walls leading to said slots, and a movable shear member contained within the guard.

6. An implement of the class described, comprising a cylindrical guard having shearing teeth therein, a holder having opposed inwardly projecting bosses arranged telescopically to engage and support the guard at its ends only, a reciprocatory shearing member within the guard, and driving connections engaging said member independently of the guard.

7. An implement of the class described, comprising a holder having spaced arms, a tubular guard having cross slots in its contact face, a movable shearing member contained within the guard and removable therewith as a unit, and means for clamping or releasing one of said arms causing it to engage or disengage the guard.

8. An implement of the class described, comprising a cylindrical guard having shearing teeth, an elongated cutter movable therein, and supports for the guard comprising upstanding arms engaging the ends of the guard, and means offset with respect to the guard for releasing one of said arms from its operative position.

JOSEPH MUROS.